March 2, 1943. E. ERICKSSON 2,312,887
ROLL FILM CAMERA ATTACHMENT
Filed Jan. 29, 1940 2 Sheets-Sheet 1
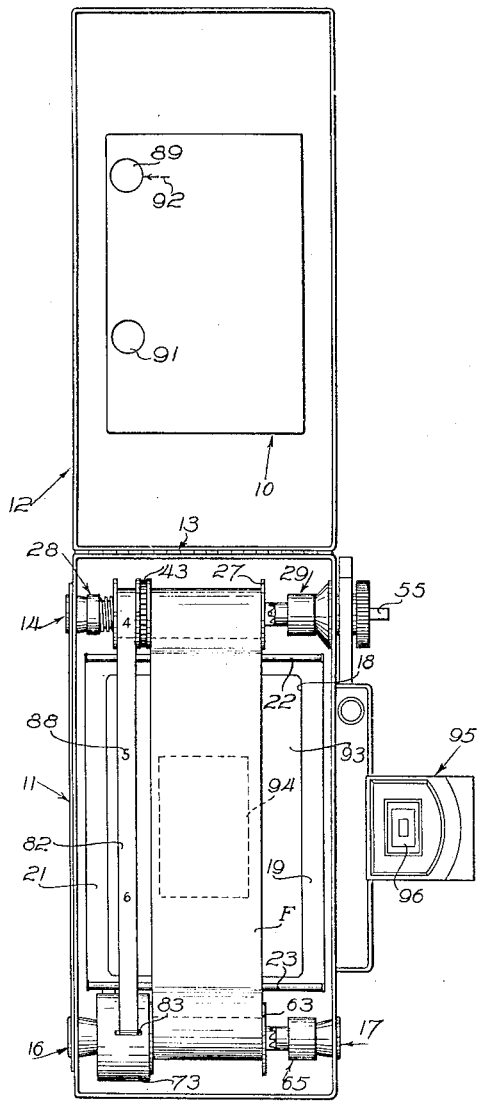
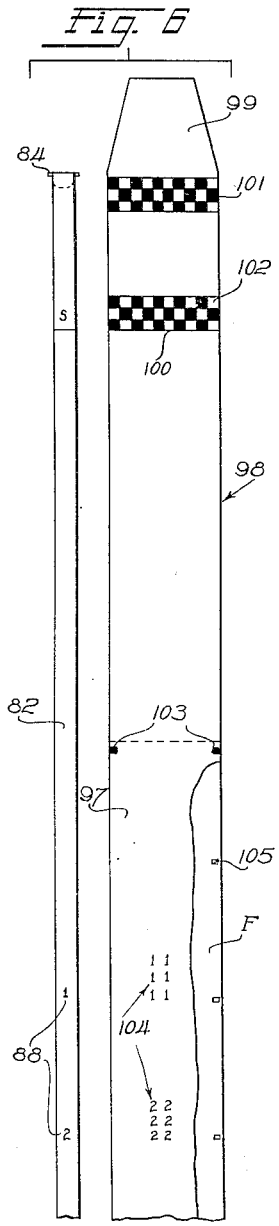
Inventor
Emil Ericksson
By Strauch & Hoffman
Attorneys March 2, 1943.  E. ERICKSSON  2,312,887
ROLL FILM CAMERA ATTACHMENT
Filed Jan. 29, 1940  2 Sheets-Sheet 2

Inventor
Emil Ericksson
By Strauch & Hoffman
Attorneys

Patented Mar. 2, 1943

2,312,887

UNITED STATES PATENT OFFICE 2,312,887

ROLL FILM CAMERA ATTACHMENT

Emil Ericksson, Chicago, Ill., assignor of one-half to Ellen Alder, Chicago, Ill.

Application January 29, 1940, Serial No. 316,244

12 Claims. (Cl. 242—71)

This invention relates to roll firm cameras and is more particularly concerned with attachments for enabling roll firm of small dimensions to be used in cameras designed for larger film.

A great many roll film cameras popular today are designed to use relatively wide film having large exposure areas to the order of 2¼" x 2¼", 2¼" x 3¼", 3" x 4" and like dimensions. Film spools carrying these films are necessarily relatively long and are mounted in the camera upon suitable support studs projecting inwardly from opposed walls at opposite sides of the exposure aperture.

Recently there has been growing, popular interest in color photography which has resulted in the appearance of much color film on the market. For economical and other reasons, this color film is usually much smaller than the wide film above-described, the film and the available exposure areas being both shorter and narrower. For example a widely used color film is known as Kodachrome K–828 and has eight successive exposure areas of about ⅞" x 1⅝".

These small narrow films are wound on spools which naturally are much shorter than the above-described wide film spools and cannot ordinarily be used in a camera designed for wide film wherein the usual film spool studs are spaced apart too far to support them. In order to use this small film it is therefore necessary to either purchase a new camera especially designed for small film, an expensive alternative, or to convert the wide film camera for correctly positioning and exposing the smaller film.

The present invention is concerned with the inexpensive conversion of such large roll film cameras to enable them to use smaller films. In practicing the invention, no part of the original camera is defaced or permanently altered, the conversion requiring only the installment of special spool adapters and exposure aperture and view finder masks; and these attachments can be quickly removed to restore the camera to original shape for large film use.

The invention is not limited to conversion for color film use, the latter being mentioned for purposes of illustration only, but may be employed for adapting any roll film camera for using smaller size film.

It has heretofore been proposed to provide adapters of various constructions for centrally locating and supporting such short film spools in large wide film cameras but most of these adapters have proved unsatisfactory due partly to relatively complicated and/or expensive construction and mainly to the fact that none of them provided satisfactory arrangements for measurably indicating the position of the small film before the exposure aperture.

Some large cameras, equipped with these prior art adapters, were provided with additional apertures at the camera back for observing the usual numerals on the backing paper of the small film, but such apertures involved permanent alteration of each original camera structure. Such additional apertures ordinarily have to be made at a specially equipped shop which is objectionable to the ordinary camera user, whereas my invention contemplates quick easy conversion of the camera by the ordinary owner without special skill.

With the above in mind, it is a major object of the present invention to provide novel inexpensive, simple roll film camera spool adapters for converting a roll film camera, designed for exposure of large film for correct exposure of smaller film.

It is a further object of the invention to provide novel attachment means for a large roll film camera converting it for correctly exposing smaller film and including an accurate indicator for indicating proper register of the smaller film before the exposure aperture.

A further object of the invention is to provide a converted roll film camera having novel arrangements for indicating register of the film before the exposure aperture.

A further object of the invention is to provide film spool adapters of novel construction for enabling narrow film wound on relatively short spools to be used in cameras designed for wide film wound on relatively long spools wherein the adapters embody a novel visual indicator for indicating the register of the film before the exposure aperture. Specifically, extension adapters are provided at opposite ends of such short spools for mounting them on the conventional film spool studs in the large camera and a graduated indicator tape is stretched parallel to the film in position to be observed through a conventional peep hole at the back of the camera. The invention also embraces a novel method of calibrating such an indicator tape.

Further objects of the invention will appear as the description proceeds in connection with the appended claims and the annexed drawings, in which:

Figure 1 is a rear elevation of a wide film camera with the back cover open illustrating the novel film spool adapter and tape indicator arrangements of the invention as used in such a camera.

Figure 6 illustrates the preferred manner of calibrating the indicator tape with a particular size of film.

Figure 3:
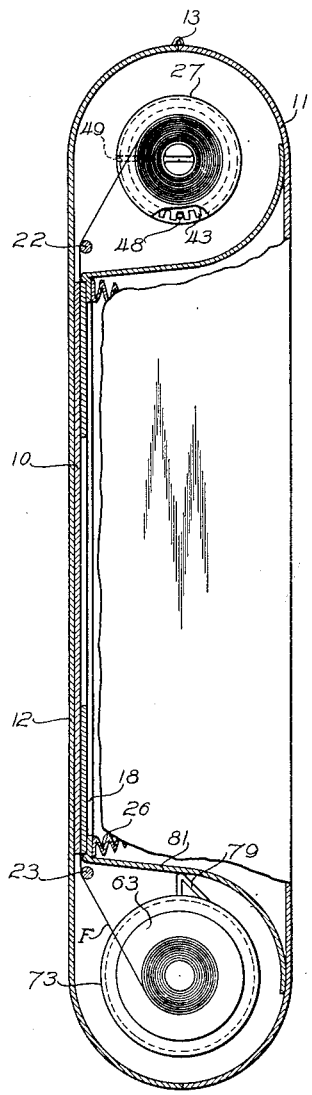
Figure 3 is a side elevation partly in section of the camera body of Figure 2.

Referring to Figure 1, the camera comprises a body portion 11 having a back cover 12 hinged thereto at 13. Cover 12 is provided on its inner surface with a plate 10 designed to back up the film when the cover is closed as shown in Figure 3. At opposite corners, the camera is provided with the usual aligned pairs of spool holding studs designated at 14 and 15, 16 and 17, respectively, carried by the opposite side walls of the camera body. The illustrated camera is of the type designed for taking pictures of relatively large size, specifically intended for exposing film areas 2¼ inches wide and 3¼ inches long, and is provided with a film exposure aperture 18 of that size. Aperture 18 is flanked by rails 19 and 21, which ordinarily serve as edge guides supporting and guiding the wide film over the exposure aperture. At opposite ends of the exposure aperture, the camera is provided with parallel freely rotatable guide rollers 22 and 23 which are journaled at opposite sides of the camera body and between which the film is stretched in a plane during exposure.

The camera is also provided with a lens 24 held in a suitable lens mount 25 at the forward end of the usual collapsible bellows arrangement 26. Bellows 26 is secured to the interior camera wall defining exposure aperture 18 in the usual manner so as to seal the aperture against exposure to light except that passing through the lens.

When the camera is employed for taking pictures on the large size of film for which it is designed, a relatively long film spool carrying the unexposed wide film is mounted in the usual manner between studs 16 and 17 and a long rewind spool is supported between studs 14 and 15.

Short spools carrying smaller size film, such as Kodachrome No. K-828, above described, could not be mounted on the above-described film spool studs because the latter are spaced too far apart; and adapter mechanism for supporting such short spools in the camera for correctly exposing the film thereon will now be described.

Figure 2:
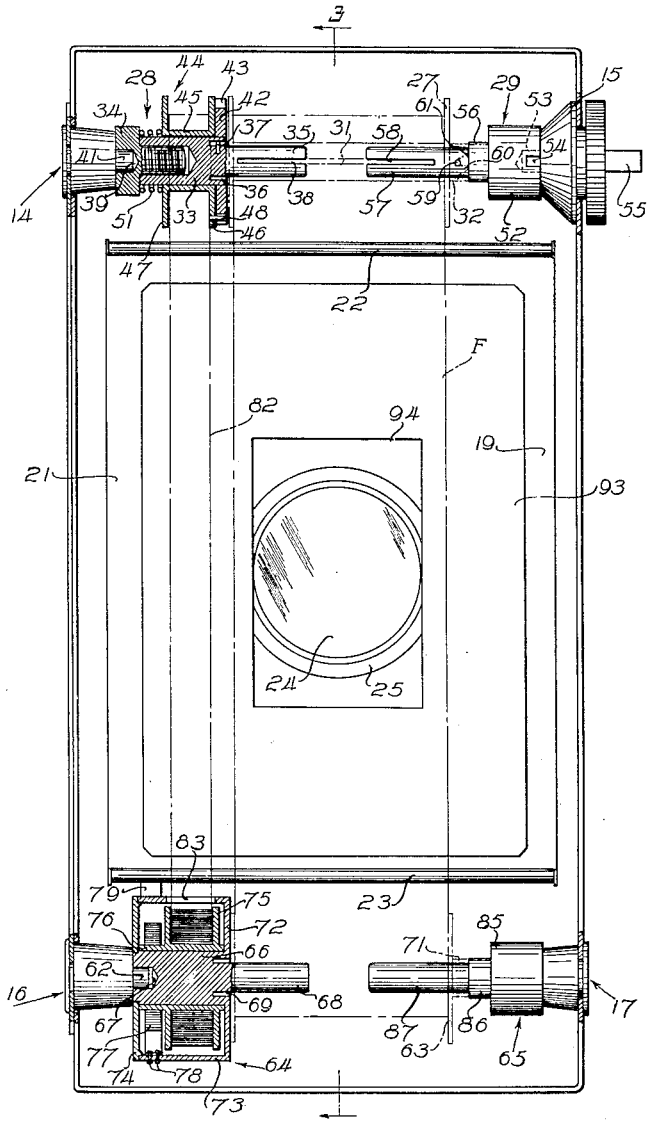
Figure 2 is an end elevation partly in section of the body of the camera of Figure 1 illustrating in detail the film spool adapter structure.
Figures 4, 5:
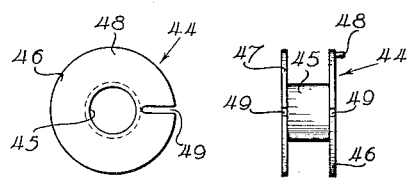
Figure 4 is an end view of the slidable combined tape rewind reel and clutch element on the adapter supporting one end of the film rewind spool.
Figure 5 is a side elevation of the reel of Figure 4.

As illustrated in Figures 1 and 2, the short rewind film spool 27 is supported upon end extension adapters 28 and 29, extending from aligned studs 14 and 15, respectively. Film spool 27 is of the usual short type having a hollow spindle longitudinally slotted at 31 for receiving the leading end of the film and hollow toothed spindle projections 32 at opposite ends.

Adapter 28 comprises a short cylindrical shaft 33 formed at its outer end with an enlarged button or head 34 and at its inner end with an elongated reduced rod 35 which extends a substantial distance into the interior of the hollow spindle of the spool. Shaft 33 is formed with a narrow annular recess 36 surrounding the base of rod 35, and rod 35 is provided with a radial pin 37 within that recess. Recess 36 is of such size as to accommodate the adjacent toothed projection 32, and pin 37 fits between adjacent teeth of that projection. Rod 35 is diametrally slotted at 38 for a purpose later to be described. Button 34 is recessed at 39 to fit rotatably upon the usual cylindrical bearing post 41 at the inner end of stud 14.

Shaft 33 has non-rotatably secured thereto a a disc 42 having a series of peripheral teeth 43. A tape rewind reel 44 comprising a hollow sleeve 45 provided with parallel end walls 46 and 47 is rotatably and slidably mounted on shaft 33 between head 34 and disc 42. Wall 46 is provided adjacent its periphery with a rigid lateral pin 48 adapted to project inwardly into the space between any selected teeth 43 on disc 42. Walls 46 and 47 are formed with aligned radially extending tape end receiving slots 49 displaced about 90° from pin 48.

A compression spring 51, surrounding shaft 33 and extending between head 34 and reel wall 47, urges the reel toward disc 42 so as to normally maintain pin 48 clutched in selected engagement with teeth 43 and thereby locks the reel and shaft for rotation together. Reel 44 may be pushed axially along shaft 33, against the force of spring 51 until pin 48 is disengaged from teeth 43, and this will permit relative rotation between the shaft and reel to any desired degree. When the reel is released, spring 51 forces it to the right along shaft 33 (Figure 2) until pin 48 is again clutched with teeth 43.

Adapter 29, at the opposite side of the camera, comprises a cylindrical button 52 whose outer end is formed with a central cylindrical aperture 53 and a diametrically slotted portion 54 for interfitting with the usual winding key stud 15. Stud 15 is rotatably mounted in a side wall of the camera and provided externally of the camera with the usual winding key 55. Button 52 is provided with a reduced inner portion 56 which terminates in a still further reduced rod portion 57 similar to rod 35 and likewise adapted to extend within the hollow spindle of the spool. Rod 57 is diametrally slotted at 58 and is provided adjacent its base with a radially projecting pin 59 designed to fit between adjacent teeth 60 formed in the hollow projecting end of the spool spindle. Engagement of toothed spindle projections 32 with pins 37 and 59 locks spool 27 for rotation with stud 15 when key 55 is rotated. The inner edge of portion 56 forms a shoulder 61 abutting projections 32 thereby cooperating with recess 36 in centrally locating the spool in the camera.

At the other end of the camera, studs 16 and 17, which are preferably identical and provided at their inner ends with central cylindrical bearing projections 62, are adapted to support a short spool 63 containing a roll of unexposed film by means of end extension adapters 64 and 65, respectively.

Adapter 64 comprises a cylindrical shaft 66 formed with a suitable cylindrical recess 67 at its outer end fitting rotatably over projection 62 on stud 16 and having a reduced end rod portion 68 projecting into the interior of spool 63. At the base of rod 68 is formed an annular recess 69 which is similar to recess 36 and is likewise adapted to receive the hollow spindle projection 71 at the end of the spool.

At the mouth of recess 69, shaft 66 is provided with an annular wall 72 forming one end of an annular cup-shaped tape reel housing 73. The other end wall of housing 73 comprises a removable disc 74 seated in a suitable recessed shoulder at the outer end of shaft 66 so as to be rigid therewith and held on the housing by means of suitable set screws or the like (not shown). Within housing 73, a narrow tape reel 75, whose spindle is a cylindrical sleeve 76 extending between walls 72 and 74, is rotatably mounted on shaft 66. One end of sleeve 76 extends axially beyond the tape reel and is surrounded by a torsion spring 77 which has its inner end secured in a suitable manner upon sleeve 76 and its outer end secured as by rivets 78 to the inner wall of housing 73. As shown in Figure 3, housing 73 is provided with a rigid stop projection 79 adapted to abut an inner stationary wall 81 of the camera housing, thereby preventing clockwise rotation on the tape housing when the tape is pulled out against the resistance of spring 77 as will presently appear.

Tape reel 75 carries a roll of narrow tape 82 which has one end secured in a suitable manner to sleeve 76 and whose leading end projects through a slotted aperture 83 (Figure 1) in the wall of housing 73. Tape 82 is adapted to travel parallel to the film and is formed at its leading end with an elongated bar 84 (Figure 6) adapted to bridge across and fit within slots 49 of the tape rewind reel.

At the opposite side of the camera, stud 17 supports adapter 65 which comprises an enlarged head 85, freely rotatably mounted on stud 17 in the same manner that shaft 66 is mounted on stud 16, an intermediate reduced portion 86 and a reduced rod portion 87 similar to rod 68 and likewise adapted to extend within the hollow spindle of spool 63. The inner edge of intermediate portion 86 forms a spool locating shoulder similar to shoulder 61. Spool 63 is not locked to its adapters as in spool 27, but is freely rotatable thereon.

Tape 82 is marked with a series of indicia 88 adapted to be visible through a usual peep hole 89 provided at the back of the camera. If the camera is provided with an auxiliary peep hole such as that at 91, the particular hole to cooperate with the tape is usually designed as by an identifying mark 92 at the exterior of the rear wall of the camera.

Tape 82 is specially calibrated to insure that the small film may be correctly located before the exposure aperture for initial exposure and then advanced only the correct distance between each exposure as will later be described.

*Exposure mask and view finder mask*

In order to provide an exposure aperture of proper size for the small film, a mask plate 93 which preferably comprises a rectangular sheet of metal having a central rectangular aperture 94 of dimensions corresponding to the desired picture size is provided. The outer perimeter of the mask is such that it fits snugly and immovably between rails 19 and 21 and other conventional walls of the camera as shown in Figures 2 and 3 so as to properly locate aperture 94 in alignment with the lens. Both sides of mask 93 are preferably coated with mat black paint to prevent internal reflection within the camera.

The camera is also provided with the usual view finder 95 and this finder is fitted with a suitable view reduction mask 96 preferably cut out of a sheet of colored Cellophane or the like for indicating to the operator the relative size of the picture to be taken on the small film.

Figure 6 illustrates the rear surface of a K-828 Kodachrome film strip wherein the usual opaque paper backing 97 extends beyond the terminal edge of the sensitized film strip to provide a leader strip portion 98 terminating in a wedge-shaped tip 99. Printed on the backing are the usual transverse checkered blocks 101 and 102 spaced a few inches from each other and located adjacent tip 99 and the usual aligned edge marks 103 indicating the terminal edge of sensitized film F. The rear edge 100 of the rearmost checkered area 102 is preferably employed as a fiducial mark in practicing my invention as will presently appear. The backing paper is also printed with the usual numeral groups designated by 104 intended to be viewed through peep hole windows at the back of the camera for determining that portion of the film which is before the exposure aperture. These numeral groups cannot appear beneath the conventional peep hole 89 of a larger camera as above explained and for that purpose will now be described.

*Assembly and operation*

Film aperture mask 93 and view finder mask 96 are first inserted in their proper locations in the camera. Spool 63 containing a roll of unexposed film wound thereon is assembled with adapters 64 and 65 before introduction into the camera merely by passing rods 68 and 87 into opposite ends of the hollow spool spindle as far as they will go. One toothed spindle projection 71 fits easily within recess 69 which is of such depth so that the end flange of the spool lies substantially flush with wall 72, and the other spindle end projection 71 abuts against the shoulder formed by member 86 so that the spool is held against axial movement by the adapter assembly.

The outer ends of adapters 64 and 65 are formed exactly as the outer ends of the longer wide film spools designed for use in the camera, and the whole assembly including short film spool 63 and the attached adapters is exactly the length of the longer spools and may be readily inserted as a unit into the camera in the same manner that the longer spools are usually inserted into the position illustrated in Figures 1 and 2. In this position, spool 63 is exactly centered with the exposure aperture.

Adapters 28 and 29 are mounted at opposite ends of the short empty rewind spool 27 by thrusting rods 35 and 57 into opposite ends of the hollow film spool spindle. In assembling these adapters and spool 27 before introduction into the camera, care is taken that the projecting toothed ends 60 of the spool spindle fit with pins 37 and 59 in such a manner that slots 38 and 58 are aligned with each other and the longitudinal spool spindle slot 31.

Care is also taken to align slots 49 with slots 31, 38 and 58, so that all lie in the same plane, by declutching reel 44 and rotating it on shaft 33 until it is properly located.

Recess 36 is of just sufficient depth to receive projection 32 and locate spool 27 so that its adjacent side flange is almost flush with disc 42 and in the same plane as the corresponding side flange of spool 63 in the camera.

Shoulder 61 abuts the other spool spindle projection 32 so as to hold spool 27 against axial movement.

When mounted in the above-described manner, the whole assembly including short spool 27 and associated adapter extensions is of exactly the same length as the long spool for which the camera was designed. The outer ends of adapters 28 and 29 are shaped exactly as the opposite ends of that long spool, and the whole assembly may be inserted into the camera, as a unit between studs 14 and 15 in the usual manner.

Rotation of stud 15 by turning key 55 will thereby rotate spool 27 to wind the film thereupon after exposure as will be explained.

With the spools mounted in the camera on their adapter extensions, the tip end 99 of the usual paper leader strip of film F is pulled past the exposure aperture and thrust into slot 31. Slots 38 and 58 of the adapter rods permit such insertion of the leader strip end at a substantial distance.

With tip 99 thrust into the spool spindle as far as it will go, tape 82 is pulled from its housing and attached to reel 44 by inserting bar 84 across slots 49. A starting mark S on the tape will then ordinarily be aligned with the edge 100 if the leader strip dimensions are uniform and standard. However, if edge 100 and mark S are not aligned, they can be quickly brought into alignment by temporarily declutching reel 44 from the spool by pushing the reel to the left in Figure 2 until pin 48 leaves teeth 43 and relatively rotating the reel and spool. The reel may then be released to permit spring 51 to lock it for rotation with the spool. With the camera back still open key 55 is turned to wind a few turns of film F and tape 82 upon spool 27 and reel 44 to be sure that they are securely anchored.

The camera back is then closed and key 55 turned until numeral 1 appears beneath window 89. Turning of key 55 simultaneously winds the film on spool 27 and tape 82 on reel 44 at the same rate and appearance of numeral 1 beneath window 89 indicates that the first exposure area on the sensitized portion of the film is correctly before the exposure aperture 94.

After the first exposure, the seven succeeding exposures are made in the usual manner, the operator advancing the film and tape between each exposure until the succeeding numeral appears beneath window 89 and the corresponding exposure area is located at aperture 94.

After the eighth exposure has been taken key 55 is turned until the numeral 0 appears beneath window 89. This indicates that the exposed film is wholly wound on the rewind spool and properly covered and is ready to taken out.

To remove film spool 27 after exposure, tape reel 44 is declutched from the spool and permitted to freely rotate under the pull of spring 77 to unwind the tape therefrom until the tape end is accessible. Bar 84 is withdrawn from slots 49 and the tape permitted to fully rewind within housing 73 where it is available for use with another roll of film. Then the whole assembly including spool 27 and adapters 28 and 29 are removed from the camera in the same manner that the long spool is usually removed.

Some operators prefer to wind the leader strip upon the rewind spool for a few turns before attaching the tape. In such instances the leader strip is thrust into the slotted rewind spool spindle as above-described and the film wound on the spool until a selected fiducial mark is aligned with roller 22. When K-828 film is used, this mark is preferably the rear edge 100 of the second checkered block.

Tape 82 is then attached to its rewind reel by inserting bar 84 across slots 49 and reel 44 is declutched from the film spool and independently rotated, clockwise in Figure 3 with the film rewind roll 27 being held stationary to wind the tape until starting mark S is aligned with mark 100. Reel 44 is then released to be forced into locking engagement with disc 42 by the force of spring 51.

Calibration of tape

In a preferred method of calibrating tape 82 for K-828 film, I usually employ a short spool of exposed K-828 film which has its backing paper 97 cut away along one edge as illustrated in Figure 6 to expose a series of holes 105 which normally cooperate with a register indicating latch to correctly position the film during feeding in a small camera specially designed for such small film. The unmarked tape is wound in housing 73 with the leader end projecting through slot 83 and, by means of adapters 64 and 65, the spool is inserted in the camera between studs 16 and 17 in the manner above described. An empty rewind spool is mounted by adapters on studs 14 and 15 at the other side of the aperture in the same manner as spool 27, above described. Leader strip 98 is then pulled across the exposure aperture and its end 99 inserted in the slotted spindle 31 of the rewind spool. At the same time, the leading end of tape 82 is advanced and attached to the tape rewind reel 44 by inserting bar 74 across slots 49. At this time starting mark S is placed on the tape in alignment with edge 100.

Then key 55 is wound thus advancing the film strip and the tape together at the same rate past the exposure aperture with the camera back open. When the film is properly positioned for exposure No. 1 with the first exposure area accurately located before aperture 94, I stop winding the film and mark the numeral 1 on the tape adjacent the exposure aperture. This numeral is marked on the tape so that it falls directly beneath the viewing window 89 when the back of the camera is closed.

With the point of first exposure established, I can then quickly mark the tape along its entire length with the numerals 2-8 guided by the spacing between holes 105 along the edge of the film. These holes have been spaced apart exactly the distance of a single exposure. I then continue winding the film until the sensitized portion has been completely wound on the rewind roll and covered so as to be ready for removal from the camera; and at this point I mark the tape with 0 or some similar designation in such position so as to appear beneath the view window 89 when the film has been advanced to that point.

With the tape marked as above any film roll of the size for which the tape has been calibrated can be inserted into the camera and correctly exposed as above described. For different sizes of film, the tape will have to be provided either with an additional set of calibrations, or separate tapes calibrated in the same manner.

My invention enables a large camera to be quickly and easily converted for exposing small film rolls with a minimum of skill on the part of the operator and in a very short time.

For exposing different sizes of small film in large cameras of different sizes, individual tapes are preferably calibrated. The invention is such that the present owner of a standard large picture camera, after determining what size of standard color film or other narrow film he wishes to use, can then purchase attachments already calibrated for adapting his type of camera for such small film. No permanent alteration or change in the large camera construction is necessary.

While adapters 28 and 29 have been above described as formed at their inner ends to lock with toothed end film spools, the invention is not limited to such details and is of such scope as to include any suitable adapter construction for locking the adapters to spools of any shape.

The attachments of the invention can be made in quantities and sold as standard camera accessories in all camera shops.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera, a film spool end adapter extension carrying one end of a spool comprising a rotatable support having one end formed to fit rotatably with a camera film spool stud and the other end formed to carry said spool; a film register tape reel rotatable upon and resiliently connected to said support and a stop for limiting rotation of said support.

2. In the camera recited in claim 1, said stop comprising a projection on said support adapted to contact a stationary wall of said camera.

3. In a film spool end extension adapter, a rotatable support having one end formed to fit rotatably with a camera film spool stud and the other end formed to carry said spool, a housing on said support, a film register tape wound within said housing and having a free end extending from said housing, and a spring within said housing maintaining said tape wound within said housing.

4. A film spool end extension adapter comprising a rotatable support adapted to interfit with one end of said spool, a housing surrounding a portion of said support and fixed thereto, a film register tape reel within said housing and rotatable upon said support, and a spring within said housing controlling rotation of said reel relative to said housing and tending to maintain said tape wound on said reel.

5. In the film spool adapter defined in claim 4, said spring comprising a torsion spring secured at opposite ends to said housing and reel respectively.

6. A film spool end extension adapter comprising a rotatable shaft having one end formed to fit upon a camera film spool stud and its other end formed to fit non-rotatably with said spool, a film register tape reel associated with said shaft and a releasable clutch between said reel and shaft.

7. A film spool end extension adapter comprising a rotatable shaft having one end formed to fit with a camera film spool stud and its other end formed to fit non-rotatably with said spool, a film register tape rewind reel rotatably carried by said shaft, a releasable clutch locking said shaft and reel for rotation together and a spring normally retaining said clutch engaged.

8. A film spool end extension adapter comprising a rotatable shaft having one end shaped to fit with a camera film spool stud and its other end formed to fit non-rotatably with said spool, a toothed disc rigid with said shaft, a freely rotatable tape rewind reel mounted on said shaft, a pin laterally projecting from said reel and a spring urging said reel toward said disc so as to normally maintain said reel clutched to said shaft with said pin engaged with said toothed disc.

9. A film spool end extension adapter comprising a rotatable shaft having one end slotted to fit with a camera film spool stud and winding key assembly, means at the other end of said shaft for supporting a film spool within the camera, a radial projection on said shaft interfitting with the end of said spool for locking said spool and shaft for rotation together and an elongated diametrically slotted inner end portion on said shaft adapted to extend within the hub of said spool.

10. A camera film spool end extension adapter formed at opposite ends to interfit with a spool holding stud on the camera and the spool end respectively, and film register indicator means carried by said adapter.

11. A camera film spool end extension adapter formed at opposite ends to interfit with a spool holding stud on the camera and the spool end respectively, and a film register indicator tape wound on said adapter.

12. In a camera, a pair of adapters supporting corresponding ends of rotatable film supply and take-up spools, a spring reel tape assembly carried by the supply spool adapter and a tape winding reel carried by said take-up spool adapter and connected to rotate therewith, and cooperating means on the leading end of said tape and on said winding reel for attaching the tape to said winding reel to be wound thereupon as said take-up spool is rotated.

EMIL ERICKSSON.